(12) United States Patent
Thurmon

(10) Patent No.: US 8,534,747 B2
(45) Date of Patent: Sep. 17, 2013

(54) CONVERTIBLE TILTING CARGO BED WITH TAILGATE

(75) Inventor: Donald Wayne Thurmon, Sterlington, LA (US)

(73) Assignee: Greg Block, Atlanta, GA (US)

( * ) Notice: Subject to any disclaimer, the term of this patent is extended or adjusted under 35 U.S.C. 154(b) by 0 days.

(21) Appl. No.: 13/084,376

(22) Filed: Apr. 11, 2011

(65) Prior Publication Data

US 2012/0256444 A1 Oct. 11, 2012

(51) Int. Cl.
*B60N 2/32* (2006.01)
*B60N 2/36* (2006.01)

(52) U.S. Cl.
USPC ...................................... 296/182.1

(58) Field of Classification Search
USPC .......... 296/183.1, 183.2, 184.1, 182.1, 37.15, 296/65.01, 65.16, 69, 64, 57.1
See application file for complete search history.

(56) References Cited

U.S. PATENT DOCUMENTS

| | | |
|---|---|---|
| 6,237,981 B1 | 5/2001 | Selleck |
| 6,905,159 B1 | 6/2005 | Saito et al. |
| 6,994,388 B2 | 2/2006 | Saito et al. |
| 7,240,948 B1 | 7/2007 | Houston |
| 7,416,238 B2 | 8/2008 | Houston |
| 7,578,544 B1 | 8/2009 | Shimamura et al. |
| 7,735,889 B2 | 6/2010 | Yamamura et al. |
| 7,735,896 B2 | 6/2010 | Kubota |
| 7,815,236 B2 | 10/2010 | Tanaka |
| 7,841,639 B2 | 11/2010 | Tanaka et al. |
| 2004/0031639 A1 | 2/2004 | Deves et al. |
| 2007/0290521 A1 | 12/2007 | Houston |
| 2009/0115217 A1 | 5/2009 | Tanaka |
| 2010/0060026 A1 | 3/2010 | Bowers |

*Primary Examiner* — Glenn Dayoan
*Assistant Examiner* — Melissa A Black
(74) *Attorney, Agent, or Firm* — Sutherland Asbill & Brennan LLP

(57) ABSTRACT

A convertible cargo bed for a utility vehicle can be easily converted, without tools, between passenger-seating, cargo-storage, and cargo-loading configurations. The hinged cargo bed floor and tailgate convert to a folding seat assembly that can be latched and carry passengers when not hauling cargo. A seat cushion is secured to the seating surface of the hinged floor panel and is not cargo-facing when the bed is storing cargo. The fully-functioning tailgate secures cargo in the interior of the cargo bed and can be unlatched to provide an open-bed. The convertible cargo bed can be tilted to dump cargo.

21 Claims, 5 Drawing Sheets

CONVERTIBLE TILTING CARGO BED WITH TAILGATE

CROSS-REFERENCES TO RELATED APPLICATIONS

Not applicable.

TECHNICAL FIELD

The present invention relates generally to the field of cargo beds for utility vehicles, and more particularly to a cargo bed that is convertible between cargo-loading, cargo-storage, passenger-seating, and dumping positions.

BACKGROUND OF THE INVENTION

Utility vehicles such as golf carts are commonly used to transport cargo and passengers in off-road conditions. Such vehicles conventionally include a driver seat, a front-passenger seat, and a cargo area behind the seats. Some vehicles provide additional seats behind the front seats that can be folded down to reveal the cargo area. It is also known to provide a hinged tailgate for a utility vehicle that can be opened to provide access to the cargo area.

Traditionally, convertible cargo bed assemblies require disassembly, modification, or the use of tools to convert between cargo bed functionalities. Maneuvering between configurations in known convertible cargo beds often requires at least two people and involves the removal or addition of detachable components. As such, the conversion process for conventional convertible cargo beds is time-consuming and cumbersome. None of the known utility vehicles satisfactorily provide a cargo bed with passenger-seating, cargo-storage, cargo-loading, and dumping functional configurations that can be converted quickly and easily by a single operator.

Additionally, in conventional convertible cargo bed designs wherein an additional passenger seat is provided, the additional seating surface doubles as a cargo-facing surface when the bed is carrying cargo. In these known designs, contamination of cargo-facing surfaces makes it difficult to utilize the bed's passenger-carrying function after hauling or storing cargo without first cleaning the bed's surfaces. None of the previously known convertible seat assemblies satisfactorily provide a cushioned seat and a seat back surface that do not also serve as interior surfaces of the cargo-bed when carrying cargo.

Accordingly, it would be desirable to provide a utility vehicle with a cargo bed assembly that is easily convertible between additional passenger-seating, cargo-storage, cargo-loading, and dumping configurations. It would also be desirable to provide an additional passenger seat and seat back for a convertible cargo bed wherein the seat and seat back surfaces do not also function as cargo-facing surfaces when the cargo bed is hauling cargo.

SUMMARY OF THE INVENTION

In one embodiment, a convertible cargo bed for a utility vehicle is provided. The convertible cargo bed includes a frame, a base panel attached to the frame, a first folding panel, and a second folding panel. The first folding panel includes a first edge, a second edge opposite the first edge, a top surface, and a bottom surface opposite the top surface. The second folding panel includes an inner surface and an outer surface opposite the inner surface. The convertible cargo bed further includes a first pivot joint whereby the first folding panel is attached pivotally to the base panel and a second pivot joint whereby the first folding panel is attached pivotally to the second folding panel. The convertible cargo bed is selectively positionable in a closed-bed position which includes an interior for storing cargo. In the closed-bed position, the first folding panel is substantially coplanar with the base panel in a first plane and the second folding panel lies in a second plane transverse to the first plane. In the closed-bed position, both the top surface of the first folding panel and the inner surface of the second folding panel face the interior of the convertible cargo bed.

In another embodiment, a utility vehicle with a mounted convertible cargo bed is provided. The utility vehicle includes a chassis, a convertible cargo bed attachment device attached to the chassis, and a convertible cargo bed. The convertible cargo bed includes a frame, a base panel attached to the frame, a mounting bracket, a first folding panel, and a second folding panel. The first folding panel includes a first edge, a second edge opposite the first edge, a top surface, and a bottom surface opposite the top surface. The second folding panel includes an inner surface and an outer surface opposite the inner surface. The convertible cargo bed further includes a first pivot joint whereby the first folding panel is attached pivotally to the base panel and a second pivot joint whereby the first folding panel is attached pivotally to the second folding panel. The mounting bracket is fixed to the frame, the base panel, or a combination thereof. The convertible cargo bed is selectively positionable in a closed-bed position which includes an interior for storing cargo. In the closed-bed position, the first folding panel is substantially coplanar with the base panel in a first plane and the second folding panel lies in a second plane transverse to the first plane. In the closed-bed position, both the top surface of the first folding panel and the inner surface of the second folding panel face the interior of the convertible cargo bed. The convertible cargo bed mounting bracket is attached to the convertible cargo bed attachment device.

DETAILED DESCRIPTION OF THE INVENTION

The present application will now be described more fully hereinafter with reference to the accompanying drawings, in which several embodiments of the application are shown. Like numbers refer to like elements throughout the drawings.

Figure 1:
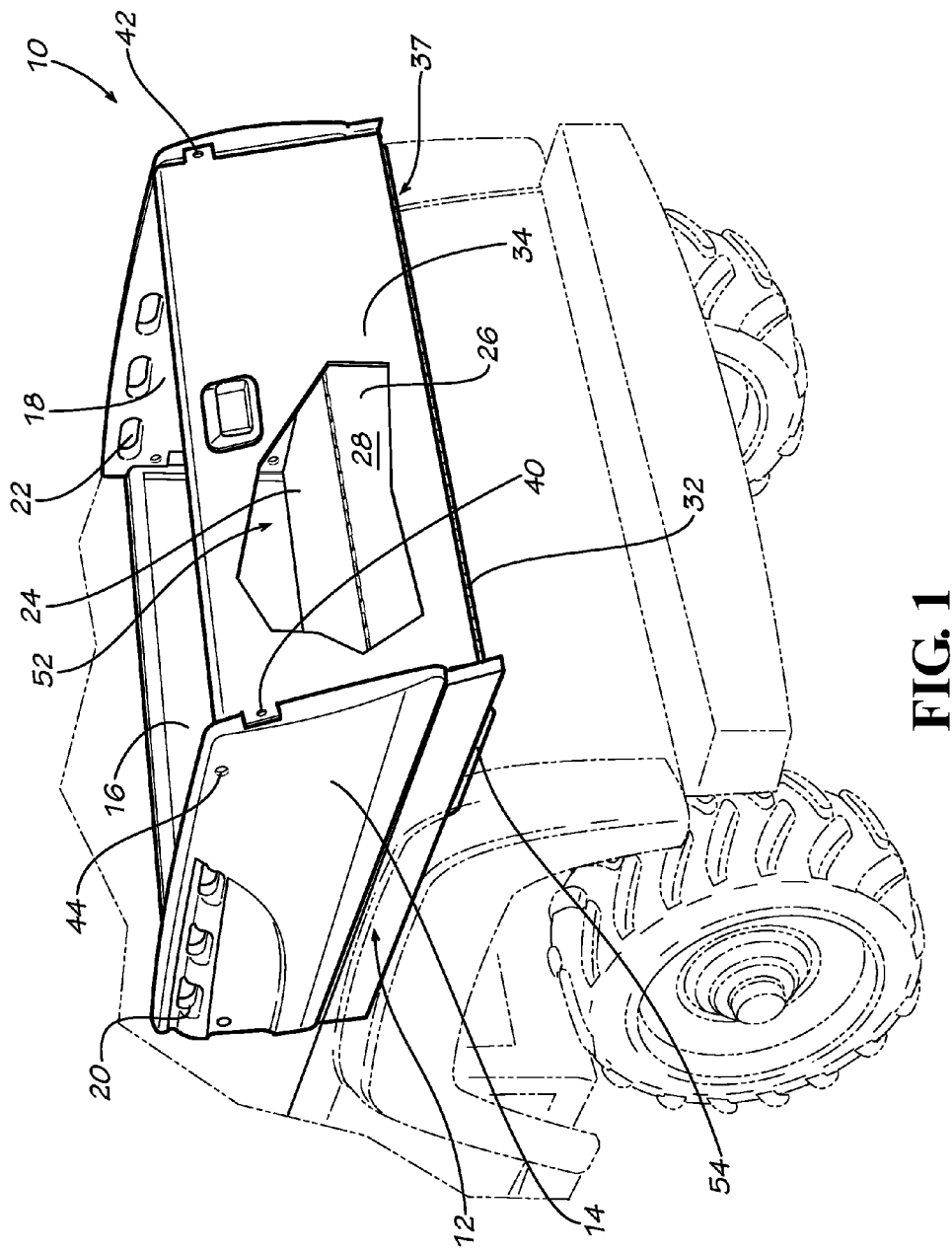
FIG. 1 is a perspective view, illustrating a convertible cargo bed in a closed-bed position in accordance with one or more embodiments of the present invention.
Figure 2:
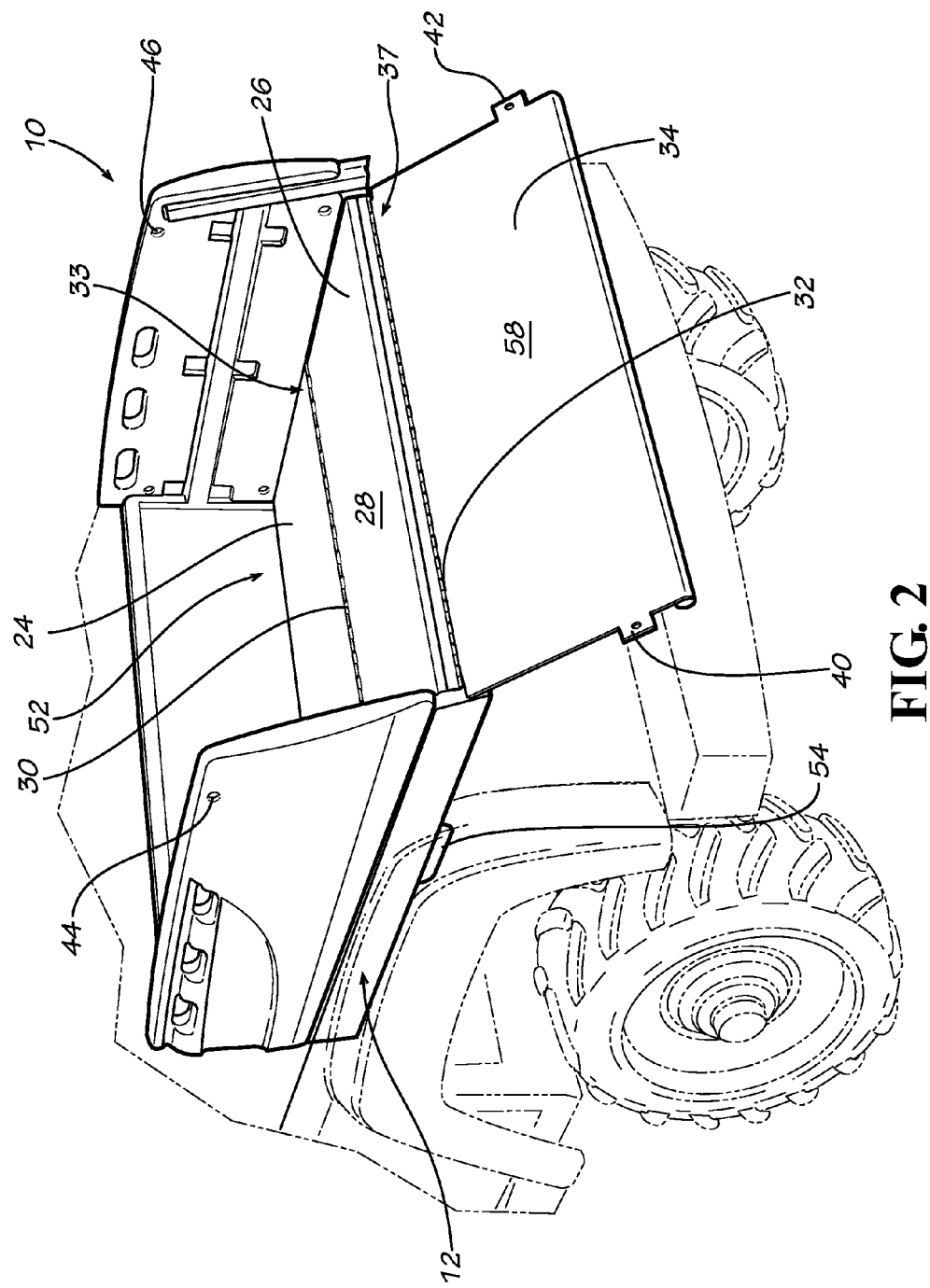
FIG. 2 is a perspective view of a convertible cargo bed in an open-bed position in accordance with one or more embodiments of the present invention.
Figure 3:
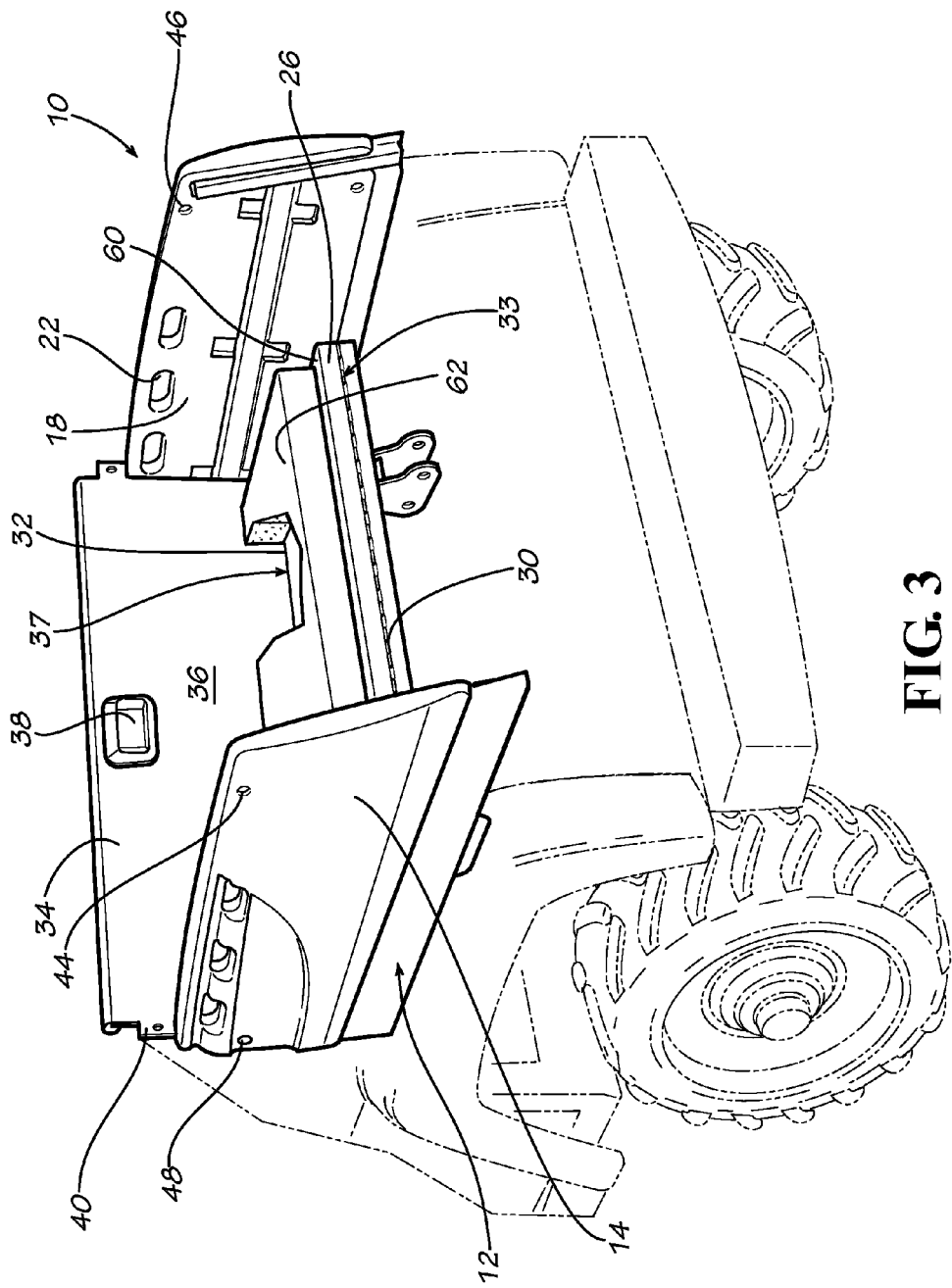
FIG. 3 is a perspective view of a convertible cargo bed in a passenger-seating position in accordance with one or more embodiments of the present invention.

A convertible cargo bed for a utility vehicle is disclosed that, in some embodiments, can be selectively positioned in a closed-bed position as shown in FIG. 1, in an alternative open-bed position as shown in FIG. 2, in an alternative passenger-seating position as shown in FIG. 3, or in any combination of the foregoing positions. When positioned in the closed-bed position, the convertible cargo bed provides an interior for containing cargo. In the open-bed position, cargo can be easily loaded and unloaded (e.g., dumped). In the passenger-seating position, the cargo bed provides additional seating for passengers.

FIGS. 1-3 show a convertible cargo bed 10 that includes a frame 12, a base panel 24 fixed to the frame 12, a first folding panel 26, and a second folding panel 34. The first folding panel 26 may function as a seat bottom when the cargo bed is in the passenger-seating position and, along with the base panel 24, as the cargo bed floor in both the closed and open-bed positions. The second folding panel 34 may function as a seat back in the passenger-seating position and as a tailgate when the cargo bed is in both the closed and open-bed positions.

The cargo bed frame 12 may comprise any number of side walls. For example, as shown in FIGS. 1-5, the frame 12 may include three side walls 14, 16, 18; however, other frame designs may also be employed. In some embodiments, one or more optional side wall handles are provided on one or more of the sidewalls to allow an operator to manually tilt the convertible cargo bed to a dumping position or to provide handholds for passengers. For example, FIGS. 1-5 depict handles 20 and 22 on sidewalls 14 and 18.

As best illustrated in FIGS. 2 and 3, the first folding panel 26 has a first edge 30, a second edge 32, a top surface 28, and a bottom surface 60. In some embodiments, the bottom surface 60 may further include a cushion 62 that covers the seat bottom when the cargo bed 10 is in the passenger-seating position, as shown in FIG. 3. When the convertible cargo bed is hauling or storing cargo, the bottom surface 60 is not cargo-facing, allowing it to remain unsoiled and thus allowing the convertible cargo bed to be readily convertible for use in its passenger-seating position without cleaning.

In one embodiment, a first pivot joint 33 connects the base panel 24 and the first folding panel 26 at the first edge 30 and enables the first folding panel 26 to be fully pivotable from a position in which the top surface 28 faces the base panel 24 (as in the passenger-seating position) to a position in which the bottom surface 60 faces the bottom surface of the base panel 24. In an alternative embodiment, the first pivot joint 33 may provide a more limited range of motion for the first folding panel 26.

As best illustrated in FIGS. 2 and 3, the second folding panel 34 of the convertible cargo bed 10 has an outer surface 36 and an inner surface 58. In one embodiment, the outer surface 36 includes a tailgate cover that functions as the seat back when the cargo bed is in the passenger-seating position. When the convertible cargo bed 10 is hauling or storing cargo, the outer surface 36 is not cargo-facing, allowing it to remain unsoiled and thus allowing the convertible cargo bed to be readily convertible for use in its passenger-seating position without cleaning. In some embodiments, the second folding panel 34 includes a tailgate handle 38 that allows an operator to easily maneuver the second folding panel between positions.

In one embodiment, a second pivot joint 37 connects the first folding panel 26 and the second folding panel 34 at the second edge 32 and enables the second folding panel 34 to be fully pivotable from a position in which the inner surface 58 of the second folding panel 34 faces the top surface 28 of the first folding panel 26 to a position in which the outer surface 36 of the second folding panel 34 faces the bottom surface 60 of the first folding panel 26. In an alternative embodiment, the second pivot joint 37 provides a more limited range of motion for the second folding panel 34. In some embodiments, the convertible cargo bed 10 includes one or more tailgate stops 40, 42 that inhibit the movement of the second folding panel 34 towards the cargo bed interior 52 past the frame 12.

In one aspect, the convertible cargo bed 10 is positionable in a closed-bed position for storing cargo, as shown in FIG. 1. In the closed-bed position, the first folding panel 26 is substantially coplanar with the base panel 24. In this context, substantially coplanar means that the two panels mostly lie in the same plane. For example, the interior-facing surface of the base panel 24 and the top surface 28 of the first folding panel 26 may both lie in the horizontal plane. In the closed-bed position, the second folding panel 34 lies in a second plane that is transverse to the plane occupied by the base panel 24 and first folding panel 26. For example, the second folding panel 34 may lie in a vertical plane intersecting the horizontal plane occupied by the base panel 24 and the first folding panel 26.

In one embodiment, the convertible cargo bed 10 includes at least one first latch 44, 46 for securing the second folding panel 34 in the closed-bed position, as shown in FIG. 1. For example, a first latch 44 may engage second folding panel 34 with side wall 14. In one embodiment, the first latch comprises a mechanized locking mechanism. In an alternative embodiment, the first latch comprises a manual locking mechanism.

In another aspect, the convertible cargo bed is positionable in an open-bed position, as shown in FIG. 2. In the open-bed position, the first folding panel 26 is substantially coplanar with the base panel 24 and the second folding panel 34 is positioned about 90 degrees or more from its closed-bed position, pivoted away from the cargo bed interior 52. For example, the second folding panel 34 may be positioned 180 degrees from its closed-bed position. Alternatively, the second folding panel 34 may be coplanar with the first folding panel 26 and the base panel 24 in the horizontal plane.

In a third aspect, the convertible cargo bed is positionable in a passenger-seating position, as shown in FIG. 3. In the passenger-seating position, the top surface 28 of the first folding panel 26 faces the base panel 24. For example, the first folding panel 26 and the base panel 24 may lie in parallel horizontal planes. In the passenger-seating position, the second folding panel 34 is transverse to both the first folding panel 26 and the base panel 24. For example, the second folding panel 34 may lie in a vertical plane intersecting the parallel horizontal planes occupied by the base panel 24 and first folding panel 26. In the passenger-seating position, the bottom surface 60 of the first folding panel 26 may function as a seat bottom and the outer surface 36 of the second folding panel 34 may function as a seat back.

In one embodiment, the convertible cargo bed 10 may optionally include at least one second latch 48, 50 for securing the second folding panel 34 in the passenger-seating position, as shown in FIG. 3. For example, a second latch 48 may engage second folding panel 34 with side wall 14. In one embodiment, the second latch may comprise a mechanized locking mechanism. In an alternative embodiment, the first latch may comprise a manual locking mechanism.

In some embodiments, a mounting bracket 54 is fixed to the frame 12, the base panel 24, or a combination thereof. For example, a mounting bracket 54 may be fixed to the base panel 24 as shown in FIG. 1.

Figure 4:
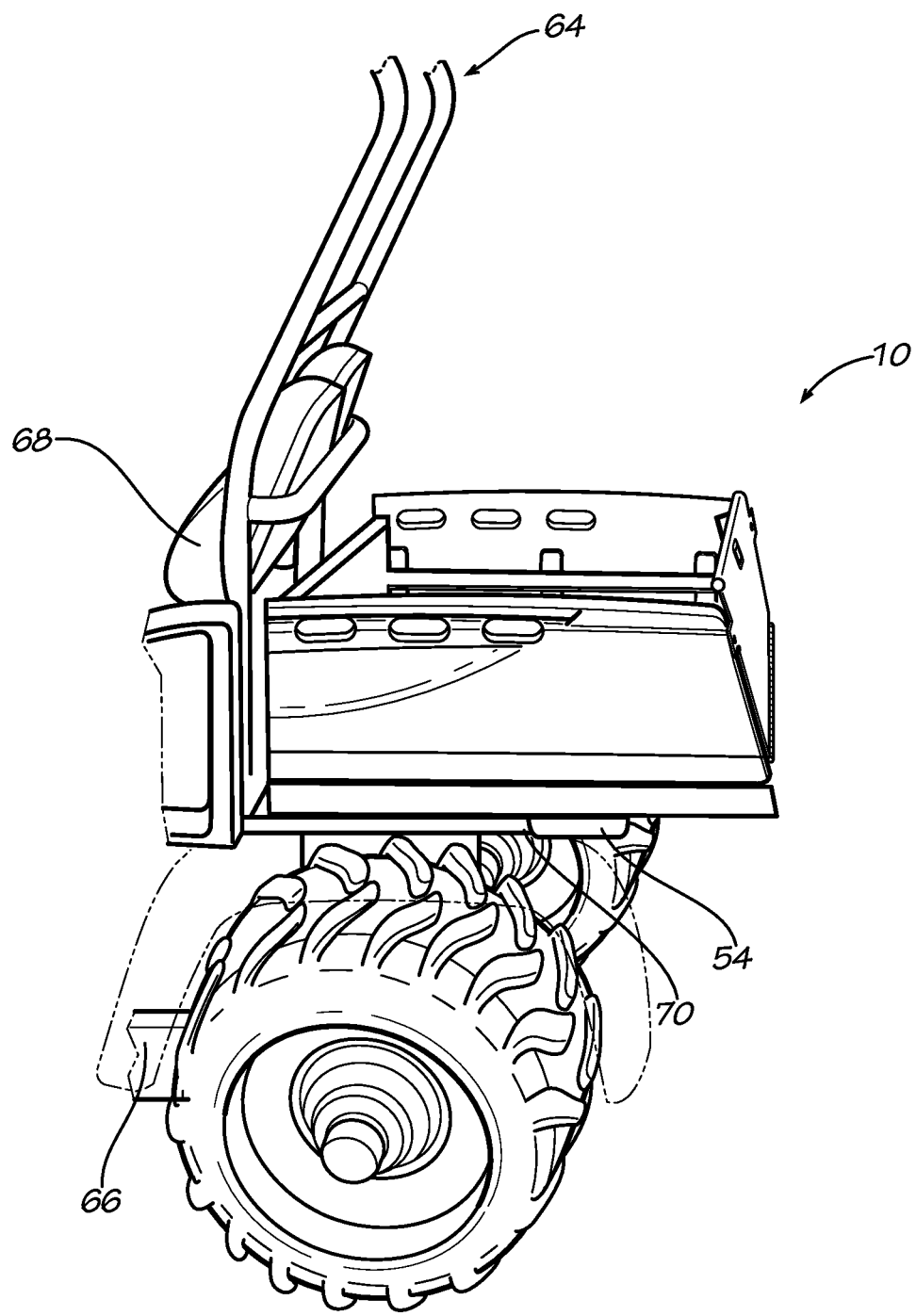
FIG. 4 is a perspective view of a utility vehicle with a mounted convertible cargo bed in a closed-bed position in accordance with one or more embodiments of the present invention.
Figure 5:
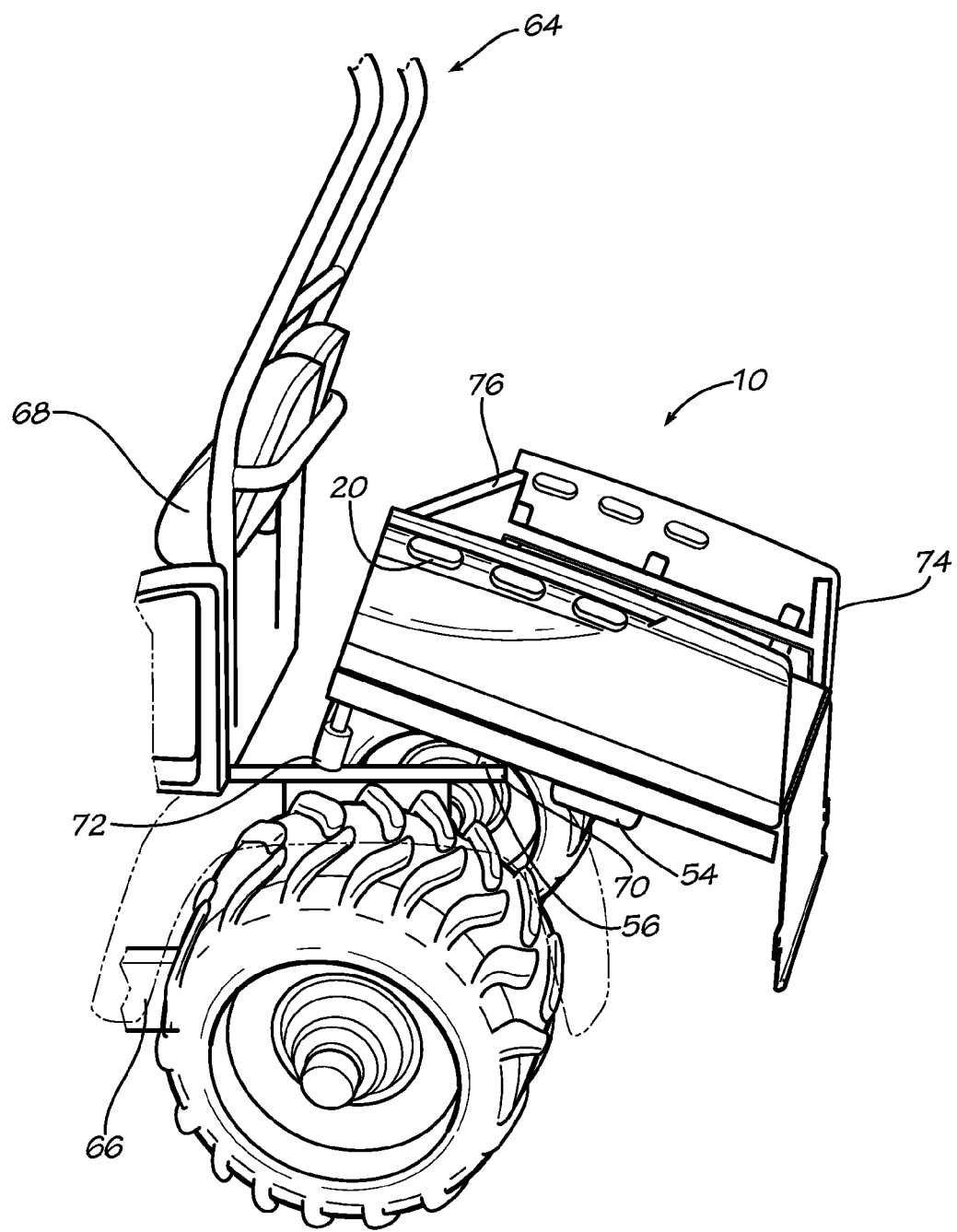
FIG. 5 is a perspective view of a utility vehicle with a mounted convertible cargo bed in an open-bed dumping position in accordance with one or more embodiments of the present invention.

According to another aspect, a utility vehicle with a mounted convertible cargo bed is provided, as shown in FIGS. 4 and 5. In some embodiments, the convertible cargo bed is selectively positionable in a closed-bed position as shown in FIG. 4, alternatively in an open-bed position as shown in FIG. 5, alternatively in a passenger-seating position, or in any combination thereof.

In some embodiments, the convertible cargo bed mounted on the utility vehicle of the present invention is easily convertible between additional passenger seating, cargo storage, and cargo loading and unloading positions. In one embodiment, the mounted convertible cargo bed provides an additional passenger seat bottom and seat back wherein the seat bottom and seat back surfaces do not also function as cargo-facing surfaces when the cargo bed is hauling cargo. As such, the presently disclosed utility vehicle with a mounted convertible cargo bed may be employed for activities in which it is necessary to move and unload goods, transport passengers, or do both in sequence. The multi-functional utility vehicle has a variety of uses including, without limitation, hunting, camping, golfing, gardening, farming, landscaping, facility maintenance, and the like.

FIGS. 4 and 5 show a utility vehicle 64 comprising a utility vehicle chassis 66, a convertible cargo bed attachment device 70, and a convertible cargo bed 10. The convertible cargo bed attachment device 70 is attached to the chassis 66. The convertible cargo bed 10 includes a mounting bracket 54 fixed to the frame 12, the base panel 24, or a combination thereof. The mounting bracket 54 is attached to the convertible cargo bed attachment device 70, thereby mounting the convertible cargo bed 10 on the utility vehicle 64.

In some embodiments, the utility vehicle 64 comprises a front end, a rear end, and a driver's seat 68 facing the front end. In such embodiments, the convertible cargo bed 10 may be attached between the driver's seat 68 and the rear end.

In some embodiments, a utility vehicle with a tilting convertible cargo bed is provided that can dump cargo, as shown in FIG. 5. In these embodiments, the convertible cargo bed 10 includes a tailgate end 74 and an opposite end 76, and the utility vehicle 64 includes at least one hinge 56 connecting the convertible cargo bed 10 to the utility vehicle chassis 66 such that the hinge allows the opposite end 76 of the convertible cargo bed 10 to be pivotally raised relative to the tailgate end 74 and thus dump the contents of the cargo bed 10. For example, an operator may use sidewall handle 20 to manually pivot the cargo bed 10 in its open-bed position via hinge 56 to dump the cargo contained in the cargo bed 10.

In some embodiments, the utility vehicle with a tilting convertible cargo bed includes an actuating device to raise the opposite end of the convertible cargo bed 10 relative to the tailgate end. In exemplary embodiments, the utility vehicle 64 may include a linear actuator 72. For example, the linear actuator may be pneumatic, hydraulic, electrical or another type known in the art.

One desirable feature of the present invention is the ease with which an operator can convert the cargo bed 10 between its various functional positions. To transition the convertible cargo bed 10 from the closed-bed position shown in FIG. 1 to the passenger-seating position shown in FIG. 3, the second folding panel 34 should be unlatched, if necessary, via optional latches 44, 46 then raised to an orientation such that it can be moved away from the tailgate end of the bed toward the opposite end. The second folding panel may then be raised to an orientation such that the tailgate stops 40, 42 can avoid the cargo bed frame 12. Upon raising the second folding panel 34, the first folding panel 26 may rotate out of the plane it shared with the base panel 24. The first folding panel 26 may be pivoted via the first pivot joint 33 to a position in which the top surface 28 faces the base panel 24. The first folding panel 26 may then lie in a horizontal plane parallel to that the base panel 24 lies in. The top surface 28 may be adjacent to the base panel 24 and the bottom surface 60 may be exposed to function as a seat bottom. The second folding panel 34 can then be rotated about the second pivot joint 37 until the second folding panel 24 is transversely situated with respect to the first folding panel 26 and base panel 24. The outer surface 36 of the second folding panel 34 may be exposed and function as a seat back. In one embodiment, the exposed bottom surface 60 of the first folding panel 26 contains a cushion 62. In one embodiment, the outer surface 36 of the second folding panel 34 contains a plastic tailgate cover. In some embodiments, the convertible cargo bed 10 includes at least one second latch 48, 50 which can be latched to secure the cargo bed 10 in the passenger-seating position as shown in FIG. 3.

To transition from the closed-bed position shown in FIG. 1 to the open-bed position shown in FIG. 2, the second folding panel 34 may be unlatched, if necessary, via optional latches 44, 46 then pivoted away from the interior 52 of the cargo bed 10 via the second pivot joint 37. In the open-bed position, the first folding panel 26 may remain substantially coplanar with the base panel 24.

As shown in FIG. 5, to utilize the dumping function of the utility vehicle 64 with mounted convertible cargo bed 10, the convertible cargo bed 10 may be positioned in the open-bed position. To dump cargo contained in the cargo bed 10, the bed may be tilted on the hinge 56 relative to the utility vehicle chassis 66 such that the opposite end 76 of the cargo bed is raised relative to the tailgate end 74. In some embodiments, this may be accomplished manually. In other embodiments, an actuating device is included to perform the dumping function. For example, the utility vehicle 64 may include a linear actuator 72.

It should be appreciated that a variety of materials known in the art may be used to construct the various components of the present invention. In preferred embodiments, the convertible cargo bed 10 may be constructed of materials which provides a reasonably rigid and durable structure for the desired functional uses of the assembly. For example, the convertible cargo bed may be constructed from metal, plastic, or a combination thereof. Likewise, the utility vehicle 64 and utility vehicle chassis 66 may be constructed out of materials well known in the art.

It should be apparent that the foregoing relates only to the preferred embodiments of the present invention that numerous changes and modifications may be made herein without departing from the spirit and the scope of the invention as defined by the following claims and equivalents thereof.

I claim:

1. A convertible cargo bed comprising:
    a frame;
    a base panel fixed to the frame;
    a first folding panel having a first edge, a second edge opposite the first edge, a top surface, and a bottom surface opposite the top surface;
    a first pivot joint connecting the base panel and the first folding panel at the first edge;
    a second folding panel including an inner surface and an outer surface opposite the inner surface; and
    a second pivot joint connecting the first folding panel and the second folding panel at the second edge of the first folding panel;
    wherein the convertible cargo bed is selectively positionable in a closed-bed position in which the convertible cargo bed has an interior for storing cargo;
    wherein in the closed-bed position the first folding panel is substantially coplanar with the base panel in a first plane and the second folding panel lies in a second plane transverse to the first plane; and wherein in the closed-bed position both the top surface of the first folding panel and the inner surface of the second folding panel face the interior of the convertible cargo bed, the second folding panel forming a tailgate at a rear of the convertible cargo bed, wherein the convertible cargo bed is configured to be attached to a utility vehicle such that the rear of the convertible cargo bed is at a rear of the utility vehicle.

2. A convertible cargo bed comprising:
a frame;
a base panel fixed to the frame;
a first folding panel having a first edge, a second edge opposite the first edge, a top surface, and a bottom surface opposite the top surface;
a first pivot joint connecting the base panel and the first folding panel at the first edge;
a second folding panel including an inner surface and an outer surface opposite the inner surface; and
a second pivot joint connecting the first folding panel and the second folding panel at the second edge of the first folding panel;
wherein the convertible cargo bed is selectively positionable in a closed-bed position in which the convertible cargo bed has an interior for storing cargo;
wherein in the closed-bed position the first folding panel is substantially coplanar with the base panel in a first plane and the second folding panel lies in a second plane transverse to the first plane;
wherein in the closed-bed position both the top surface of the first folding panel and the inner surface of the second folding panel face the interior of the convertible cargo bed;
wherein the convertible cargo bed is selectively alternatively positionable in a passenger-seating position;
wherein in the passenger-seating position the top surface of the first folding panel faces the base panel and the second folding panel is transverse to both the first folding panel and the base panel; and
wherein in the passenger-seating position the bottom surface of the first folding panel forms a seat bottom and the outer surface of the second folding panel forms a seat back.

3. The convertible cargo bed of claim 1, wherein the convertible cargo bed is selectively alternatively positionable in an open-bed position; and
wherein in the open-bed position the first folding panel is substantially coplanar with the base panel in the first plane and the second folding panel is positioned about 90 degrees or more from its closed-bed position, pivoted away from the interior of the cargo bed.

4. The convertible cargo bed of claim 1, wherein the frame comprises at least one side wall.

5. The convertible cargo bed of claim 1, further comprising at least one first latch for securing the second folding panel when the convertible cargo bed is positioned in the closed-bed position.

6. The convertible cargo bed of claim 1, further comprising at least one tailgate stop that inhibits movement of the second folding panel towards the interior of the cargo bed past the frame.

7. The convertible cargo bed of claim 1, wherein the outer surface of the second folding panel includes a tailgate cover.

8. The convertible cargo bed of claim 1, wherein the outer surface of the second folding panel includes a tailgate handle.

9. The convertible cargo bed of claim 1, further comprising a mounting bracket fixed to the frame, the base panel, or a combination thereof.

10. The convertible cargo bed of claim 2, further comprising at least one second latch for securing the second folding panel when the convertible cargo bed is positioned in the passenger-seating position.

11. The convertible cargo bed of claim 2, wherein the bottom surface of the first folding panel includes a cushion.

12. The convertible cargo bed of claim 4, further comprising at least one side wall handle on the at least one side wall.

13. The convertible cargo bed of claim 5, wherein the at least one first latch is mechanized.

14. The convertible cargo bed of claim 10, wherein the at least one second latch is mechanized.

15. A utility vehicle comprising:
a utility vehicle chassis;
a convertible cargo bed attachment device attached to the chassis;
a convertible cargo bed comprising:
a frame;
a base panel fixed to the frame;
a mounting bracket;
a first folding panel including a first edge, a second edge opposite the first edge, a top surface, and a bottom surface opposite the top surface;
a first pivot joint connecting the base panel and the first folding panel at the first edge;
a second folding panel including an inner surface and an outer surface opposite the inner surface; and
a second pivot joint connecting the first folding panel and the second folding panel at the second edge of the first folding panel;
wherein the mounting bracket is fixed to the frame, the base panel, or a combination thereof;
wherein the convertible cargo bed is selectively positionable in a closed-bed position in which the convertible cargo bed has an interior for storing cargo;
wherein in the closed-bed position the first folding panel is substantially coplanar with the base panel in a first plane and the second folding panel lies in a second plane transverse to the first plane;
wherein in the closed-bed position both the top surface of the first folding panel and the inner surface of the second folding panel face the interior of the convertible cargo bed, the second folding panel forming a tailgate at a rear of the convertible cargo bed; and
wherein the mounting bracket is attached to the convertible cargo bed attachment device.

16. The utility vehicle of claim 15, wherein the utility vehicle chassis comprises:
a front end;
a rear end; and
a driver's seat facing the front end;
wherein the convertible cargo bed is attached between the driver's seat and the rear end.

17. The utility vehicle of claim 15, further comprising at least one hinge connecting the convertible cargo bed to the utility vehicle chassis;
wherein the convertible cargo bed includes a tailgate end and an opposite end; and
wherein the at least one hinge allows the opposite end of the convertible cargo bed to be pivotally raised relative to the tailgate end of the convertible cargo bed.

18. The utility vehicle of claim 17, further comprising an actuating device for raising the opposite end of the convertible cargo bed relative to the tailgate end of the convertible bed.

19. The utility vehicle of claim 18, wherein the actuating device comprises a linear actuator.

20. A utility vehicle comprising:
a utility vehicle chassis;
a convertible cargo bed attachment device attached to the chassis;
a convertible cargo bed comprising:
   a frame;
   a base panel fixed to the frame;
   a mounting bracket;
   a first folding panel including a first edge, a second edge opposite the first edge, a top surface, and a bottom surface opposite the top surface;
   a first pivot joint connecting the base panel and the first folding panel at the first edge;
   a second folding panel including an inner surface and an outer surface opposite the inner surface; and
   a second pivot joint connecting the first folding panel and the second folding panel at the second edge of the first folding panel;
wherein the mounting bracket is fixed to the frame, the base panel, or a combination thereof;
wherein the convertible cargo bed is selectively positionable in a closed-bed position in which the convertible cargo bed has an interior for storing cargo;
wherein in the closed-bed position the first folding panel is substantially coplanar with the base panel in a first plane and the second folding panel lies in a second plane transverse to the first plane;
wherein in the closed-bed position both the top surface of the first folding panel and the inner surface of the second folding panel face the interior of the convertible cargo bed, the second folding panel forming a tailgate;
wherein the mounting bracket is attached to the convertible cargo bed attachment device
wherein the convertible cargo bed is selectively alternatively positionable in a passenger-seating position;
wherein in the passenger-seating position the top surface of the first folding panel faces the base panel and the second folding panel is transverse to both the first folding panel and the base panel; and
wherein in the passenger-seating position the bottom surface of the first folding panel forms a seat bottom and the outer surface of the second folding panel forms a seat back.

21. The convertible cargo bed of claim 15, wherein the convertible cargo bed is selectively alternatively positionable in an open-bed position; and
wherein in the open-bed position the first folding panel is substantially coplanar with the base panel in the first plane and the second folding panel is positioned about 90 degrees or more from its closed-bed position, pivoted away from the interior of the cargo bed.

* * * * *